United States Patent [19]
Wardall

[11] Patent Number: 5,167,088
[45] Date of Patent: Dec. 1, 1992

[54] ADJUSTABLE FISHING LURE ACTIVATOR

[76] Inventor: Thad E. Wardall, 1020 W. Lake Sammamish NE., Bellevue, Wash. 98008

[21] Appl. No.: 692,488

[22] Filed: Apr. 29, 1991

Related U.S. Application Data

[63] Continuation-in-part of Ser. No. 591,683, Oct. 1, 1990, abandoned.

[51] Int. Cl.$^5$ .............................................. A01K 85/00
[52] U.S. Cl. .................................. 43/42.03; 43/42.11; 43/42.46; 43/43.13
[58] Field of Search ................. 43/42.03, 42.11, 42.15, 43/42.36, 42.46, 42.27, 42.49, 43.13

[56] References Cited

U.S. PATENT DOCUMENTS

| | | | |
|---|---|---|---|
| 1,440,869 | 1/1923 | Foss | 43/42.47 |
| 2,578,786 | 12/1951 | Davis | 43/42.11 X |
| 2,619,760 | 12/1952 | Maddux | 43/42.15 |
| 2,708,805 | 5/1955 | Garvie | 43/42.15 |
| 2,883,785 | 4/1959 | Croft | 43/42.09 |
| 3,570,166 | 3/1971 | Borton | 43/42.15 X |
| 4,035,945 | 7/1977 | Newman | 43/42.15 |
| 4,773,180 | 9/1988 | Shimizu | 43/42.47 X |

FOREIGN PATENT DOCUMENTS

| | | | |
|---|---|---|---|
| 1529305 | 5/1968 | France | 43/42.15 |

Primary Examiner—Richard K. Seidel
Assistant Examiner—Patty E. Hong
Attorney, Agent, or Firm—Robert W. Jenny

[57] ABSTRACT

The activator is cut and shaped from sheet plastic and installed on the leader just in front of the lure attached to the leader. Motion of the lure and activator through water causes the activator to oscillate angularly, generating alternating lateral forces on the leader and thereby activating the lure. In a preferred embodiment the planform of the activator is circular with a hole at its center and the activator is creased radially from the hole to its perimeter so that the portions of the activator adjoining the crease are at a shallow angle to each other. Creasing, as different from bending or forming, stretches the material at the open side of the angle at the crease beyond its elastic limit and allows it to take a set. The stretched material is under compression when the part is finished, the compression holding the adjoining portions at an angle. This technique virtually eliminates the tendency of the plastic to resume its preformed shape and allows manual adjustment of the angle. Alernate embodiments include polygonal and elliptical planforms, two radial creases at angles to each other ranging from 1 degree to 180 degrees or one or more chordal creases that do not intersect the center hole. The activator may be slit from the hole to the perimeter to facilitate installation and removal.

2 Claims, 1 Drawing Sheet

ADJUSTABLE FISHING LURE ACTIVATOR

BACKGROUND OF THE INVENTION

This application is a continuation-in-part application based on application Ser. No. 591,683, filed Oct. 1, 1990, to be abandoned when this application is duly filed.

FIELD

This invention is in the field of apparatus used in fishing, particularly the lures used to attract fish to the hook. More specifically it is in the field of apparatus used to cause lure motions which may simulate the motions of various creatures lures represent, creatures such as insects and minnows.

PRIOR ART

There are many fishing lures, patented and not, which incorporate a feature or features which activate the lure; i.e. cause lifelike motion of the lure. In some cases the feature is or features are embodied in the configuration of the lure itself in the form of surfaces which interact with the water through which the lure is moving to activate the lure. In others the feature is or features are vanes and the like which are attached to the lure and interact with the water. In still others the vanes and the like, called activators for purposes of this disclosure, are installed on the leader to which the lure is attached or to apparatus connecting the leader to the lure. Activators so installed deflect angularly with respect to the direction of motion of the lure and oscillate from angular deflection in one direction to angular deflection in the other. The cyclic motion of the activator through water generates forces on the activator and the cyclic angular deflections cause alternating sideward forces on the leader and lure, first in one direction, then the other. These forces produce the desired activation of the lure and the activation is greater than could be produced by vanes and the like of equivalent size attached directly to the lure and not able to defect angularly with respect to the direction of motion of the lure through the water.

Prior art examples of activators are shown in the U.S. Pats. listed here:

|  | 1,440,869 | 2,883,785 |
|---|---|---|
|  | 2,578,786 | 4,035,945 |
|  | 2,619,760 | 4,773,180 |
| French: | 1,529,305 |  |

Because of the well known hazards of fishing, particularly in shallow streams in wooded areas, lures and related equipment must be considered expendable and therefore the cost of such equipment becomes a more serious consideration.

The prior art apparatus is more complicated and more expensive than is desireable. The "plaque" of the French patent is the least complicated and least expensive prior art apparatus. Also, the mounting of the "plaque" directly on the leader e in FIG. 1 of the French patent is the least expensive, satisfactory way to use such activators. In the French patent it is stated that a curved "plaque" (h in FIG. 3) is more effective than a flat "plaque" (g in FIG. 3) of the same planform shape and size. (For purposes of this disclosure a plan is an outline and a planform is the shape or form of the outline. Also a perimeter is the edge of a sheet of material having a planform). In development of the subject invention it has been found that considerable (relatively) time and expense are required to either blank the part out of flat sheet plastic, the preferred material, and then curve or form each piece thermally or chemically following the blanking process, or to provide special blanking dies to blank each part out of material that has been curved or formed beforehand. The quantities of parts that can be obtained from material that has been formed or curved prior to blanking is somewhat limited by the radius of curvature of the material.

A further complication is that the amount of curvature or bend in the activator is crucial to its effectiveness. Consequently, for an activator of a given size used with a lure of a given length and weight, it is desireable that the activator's curvature or bend be moderately adjustable to assure optimum performance. Most plastic materials that have been heat formed to specific configurations, such as the curves represented by the prior art, have a "memory" or tendency to maintain and return to their formed shapes after being mechanically flexed or deformed. This plastic "memory" makes it difficult to induce manual adjustments to activators that have been formed to the configurations represented by the prior art.

Since the cost of making the activator is an important concern, a prime objective of the subject invention is to provide a highly effective fish lure activator which is relatively inexpensive to manufacture, less expensive than the plaque in the French patent. A second objective is that any deformation of the activator out of a flat planar shape be stable. A third objective is that the deformation be manually adjustable to adapt the activator to particular use conditions.

SUMMARY OF THE INVENTION

The subject invention is a fishing lure activator which can be termed a baffle or plaque, is installed just ahead of the lure on the leader to which the lure is attached and is free to vibrate or oscillate, generating alternate lateral forces on the leader to activate the lure as the leader, activator and lure are pulled through water. The subject activator has a planform which is symmetrical about a hole at its center, the planform shape being circular, polygonal or elliptical, circular being the preferred shape. The activator is provided in a series of thicknesses and sizes. The thickness and major dimension of the planform (such as a radius) are selected to suit the size, weight and shape of any particular lure. The activator is made from flat material and, in the preferred embodiment, is creased radially from the center hole to the periphery. After creasing the plaque is no longer flat but is essentially flat and the portions adjoining the crease are held at an included angle to each other with the remaining portion being forced to curve somewhat to accommodate the angle between the portions next to the crease. For purposes of this disclosure the smaller of the two angles between the two portions adjoining the crease is the included angle. The larger angle is termed the open angle. The activator is installed on the leader just ahead of the lure with the included angle facing away from the lure.

In a second embodiment there are two radial creases with the angle between them in the range of 10° to 180°. (With the angle at 180° there is, in effect, one crease diametrically across the plaque.)

In a third embodiment there is at least one crease which does not intersect the center hole; i.e. the crease(s) is/are chordal.

The plaque of each embodiment may be slit from the periphery to the center hole to facilitate installation and removal of the activator.

The size of the center hole is important. If it is too small, angular motion of the activator on the line can be inhibited. If it is too large the activator will not be properly centered.

The exact location(s) of the crease or creases, the size of the center hole and the location of the radial slit from the periphery to the center hole are considered to be design choices.

It has been found that the memory characteristic of plastic material, i.e. its tendency to return to its original shape after being deformed, is essentially eliminated when the material is creased, as different from bent or folded. Also, the material is amenable to manual adjustment of the angle at the crease to optimize performance.

The slit may be configured to inhibit movement of the activator off the line during use or, for the same purpose the slit may be positioned to enter the hole essentially tangentially, i.e. near the perimeter of the hole.

The invention is described in more detail below with reference to the attached drawing.

DETAILED DESCRIPTION OF THE INVENTION

Figure 1:
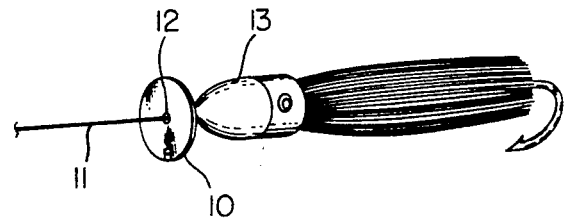
FIG. 1 is a perspective view of a preferred embodiment of the subject invention installed and ready for use.

The subject invention is an activator for fish lures. A preferred embodiment is shown in FIG. 1. Activator 10 is installed onto leader 11 with the leader running through hole 12. The activator is positioned just ahead of lure 13 attached to the leader. As the leader, lure and activator are pulled through the water when fishing the activator oscillates angularly, generating alternating lateral forces on the leader to activate the lure.

Figure 2:
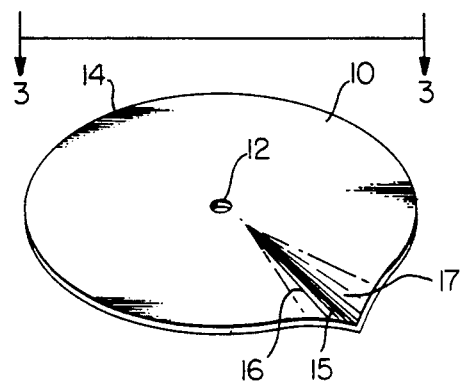
FIG. 2 is a perspective view of the preferred embodiment of FIG. 1.

FIG. 2 is a perspective view of the preferred embodiment 10 shown in FIG. 1. It is made of plastic sheet of appropriate thickness. Periphery 14 is circular and hole 12 is at the center of the resulting circular planform. Crease 15 extends from hole 12 radially to periphery 14. For purposes of this disclosure a crease differs from a bend in that in bending plastic material to the shallow angle shown between portions 16 and 17 adjoining the crease involves deforming the material just sufficiently to achieve the bend while creasing the material involves stretching the material on the open angle side of the material well beyond its elastic limit and having it take a set so that when the material is allowed to relax the set material is in compression and holds the sheet in the angled conformation. Creasing virtually eliminates the tendency for plastic material to return to its original conformation and puts the material at the crease in condition which enables reliable, accurate manual adjustment of the angle between portions 16 and 17.

Figure 3:
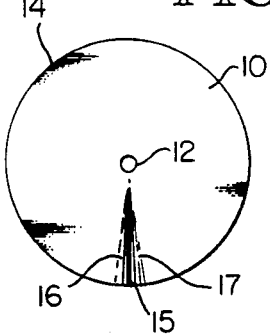
FIG. 3 is a view taken at 3—3 in FIG. 2.

FIG. 3 is a plan view of the activator, taken at 3—3 in FIG. 2 and illustrating the circular planform.

Figure 4:
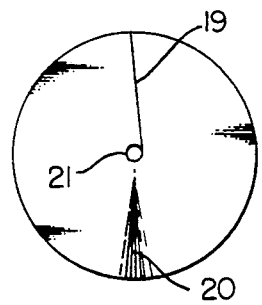
FIG. 4 is a plan view of the FIG. 2 embodiment slit to facilitate installation and removal.

FIG. 4 illustrates in plan view an activator 18 similar to that of FIG. 3 but having a slit 19 positioned diametrically opposite the crease 20. The slit facilitates installation and removal of the activator. The slit is shown entering hole 21 tangentially. This positioning of the slit relative to the hole inhibits inadvertent removal of the activator from the leader on which it is installed.

Figure 5:
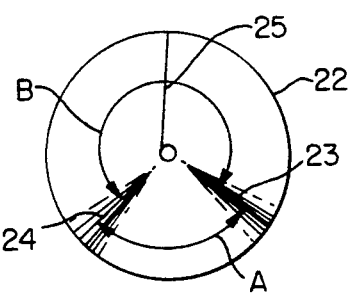
FIG. 5 is a plan view of a third embodiment of the invention having two creases and a slit.

FIG. 5 illustrates in plan view a third embodiment 22 of the invention. There are two radial creases 23 and 24 at angle A to each other. Angle A, the included angle, is in the range of 1° to 180°. Slit 25 is positioned to bisect angle B, the open angle between the creases.

Figure 6:
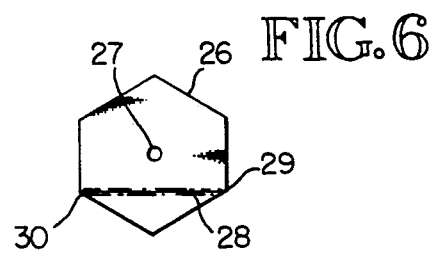
FIG. 6 illustrates in plan view a fourth embodiment of the invention having a polygonal planform and one chordal crease running between two non-adjacent corners of the planform.

FIG. 6 illustrates a fourth embodiment of the invention, in plan view. The plaque 26 is hexagonal with hole 27 at its center and crease 28 extending from corner 29 to corner 30. The triangular portion below the crease is angled out of the paper to form a shallow included angle with the remainder of the plaque.

The subject activator is essentially flat and the creases in the various embodiments are chordal or radial; i.e. non-diametric.

It has been found during the investigation of techniques for manufacturing the subject invention that the activator can be die cut (blanked) out of flat plastic sheet and creased in one operation with each part assuming its finished shape upon release from the dies. However, blanking and creasing in two operations is clearly economically feasible. Field testing has shown that activators made according to the subject invention are highly effective, particularly since they can be reliably and accurately manually adjusted to suit specific use conditions.

It is considered to be clear from this description that the invention meets its objectives. The subject activator is effective and relatively inexpensive to manufacture. Its shape is stable since the creasing technique essentially eliminates the tendency for the plastic to assume preformed shape. The creasing technique also renders the angles in the shapes of the activators manually adjustable. It is also considered to be understood that while certain embodiments of the invention are described herein, other embodiments and modifications of those described are possible within the scope of the invention which is limited only by the attached claims.

I claim:

1. An activator for a fishlure, said fishlure being attached to a leader, said activator comprising a plaque, said plaque having a planform, a periphery and a hole through said plaque, said activator being installed on said leader with said leader through said hole, said planform being symmetrical about said hole, said plaque being essentially flat and having at least one non-diametric crease and first and second portions of said plaque adjoining said at least one crease, said first and second portions being held at an included angle to each other by said at least one crease, said activator being installed on said leader with said included angle facing away from said lure, said at least one crease rendering said activator reliably and accurately manually adjustable.

2. The activator of claim 1 further comprising a radial slit extending from said hole to said periphery, said slit entering said hole tangentially.

* * * * *